US012657858B2

(12) United States Patent
Balthasar et al.

(10) Patent No.: US 12,657,858 B2
(45) Date of Patent: Jun. 16, 2026

(54) NEURAL NETWORK FOR BULK SORTING

(71) Applicant: Tomra Sorting GmbH,
Mülheim-Kärlich (DE)

(72) Inventors: Dirk Balthasar, Boppard (DE); Daniel Bender, Grafschaft (DE); Frank Schmitt, Kaifenheim (DE)

(73) Assignee: Tomra Sorting GmbH,
Mülheim-Kärlich (DE)

( * ) Notice: Subject to any disclaimer, the term of this patent is extended or adjusted under 35 U.S.C. 154(b) by 0 days.

(21) Appl. No.: 18/753,797

(22) Filed: Jun. 25, 2024

(65) Prior Publication Data

US 2024/0346794 A1     Oct. 17, 2024

Related U.S. Application Data

(63) Continuation of application No. 17/773,319, filed as application No. PCT/EP2020/080926 on Nov. 4, 2020, now Pat. No. 12,046,010.

(30) Foreign Application Priority Data

Nov. 4, 2019     (EP) .................................... 19206887

(51) Int. Cl.
| | |
|---|---|
| *B07C 5/34* | (2006.01) |
| *B07C 5/342* | (2006.01) |
| (Continued) | |

(52) U.S. Cl.
CPC .......... *G06V 10/143* (2022.01); *B07C 5/3422* (2013.01); *G06V 10/764* (2022.01);
(Continued)

(58) Field of Classification Search
CPC .... G06V 10/58; G06V 10/143; G06V 10/764; G06V 10/82; G06V 20/64
See application file for complete search history.

(56) References Cited

U.S. PATENT DOCUMENTS

| | | | |
|---|---|---|---|
| 5,242,059 A | 9/1993 | Low et al. | |
| 6,225,620 B1 | 5/2001 | Campbell et al. | |
| (Continued) | | | |

FOREIGN PATENT DOCUMENTS

| | | |
|---|---|---|
| CN | 103394475 A | 11/2013 |
| CN | 106000904 A | 10/2016 |
| (Continued) | | |

OTHER PUBLICATIONS

Bobulski et al., "Waste Classification System Using Image Processing and Convolutional Neural Networks", May 16, 2019, ROBOCUP 2008: Robot Soccer World Cup XII; Lecture Notes in Computer Science; Lect.Notes Computer, Springer International Publishing, Cham, pp. 350-361, XP047509573.
(Continued)

*Primary Examiner* — Joseph C Rodriguez
(74) *Attorney, Agent, or Firm* — .Buchanan Ingersoll & Rooney PC

(57)     ABSTRACT

A bulk sorting system for sorting objects in bulk is provided. The bulk sorting system includes: at least one radiation source arranged to radiate the objects, at least one optical sensor arranged to capture reflected radiation of the objects and acquire the reflected radiation as multi- or hyperspectral data; a processing circuit configured to analyze the reflected radiation of the objects by inputting the multi- or hyperspectral data into a convolutional neural network (CNN) with at least two convolutional layers in order to either detect and classify the objects in the multi- or hyperspectral data and/or semantically segment the multi- or hyperspectral data; and a mechanical sorter configured to sort the objects according to their classification and/or segmentation using the analysis of the processing circuit such that different overlapping and/or stacked objects are separated or treated as a single group of objects.

15 Claims, 10 Drawing Sheets

(51) Int. Cl.

| | |
|---|---|
| *G06V 10/143* | (2022.01) |
| *G06V 10/764* | (2022.01) |
| *G06V 10/82* | (2022.01) |
| *G06V 20/64* | (2022.01) |
| *G06V 10/58* | (2022.01) |

(52) U.S. Cl.
CPC .............. *G06V 10/82* (2022.01); *G06V 20/64* (2022.01); *G06V 10/58* (2022.01)

(56) References Cited

U.S. PATENT DOCUMENTS

| | | | | |
|---|---|---|---|---|
| 8,609,422 | B2 * | 12/2013 | Durack | A01N 1/162 |
| | | | | 209/579 |
| 10,674,972 | B1 * | 6/2020 | Piatrou | G01N 23/04 |
| 11,433,429 | B2 * | 9/2022 | Ma | B07C 3/08 |
| 11,541,534 | B2 * | 1/2023 | Ku | B25J 9/1612 |
| 12,046,010 | B2 * | 7/2024 | Balthasar | G06V 20/64 |
| 12,287,269 | B2 * | 4/2025 | Hinterdorfer | G06V 10/267 |
| 12,338,082 | B2 * | 6/2025 | Skyum | B07C 5/36 |
| 2006/0081510 | A1 | 4/2006 | Kenny et al. | |
| 2007/0029232 | A1 | 2/2007 | Cowling et al. | |
| 2009/0050540 | A1 | 2/2009 | Imai et al. | |
| 2015/0160128 | A1 | 6/2015 | Liu et al. | |
| 2016/0228921 | A1 | 8/2016 | Doublet et al. | |
| 2017/0100749 | A1 * | 4/2017 | Hartmann | G06K 7/10792 |
| 2018/0100810 | A1 | 4/2018 | Sahu et al. | |
| 2018/0243800 | A1 | 8/2018 | Kumar et al. | |
| 2018/0322327 | A1 | 11/2018 | Smith et al. | |
| 2018/0345324 | A1 | 12/2018 | Hillerich et al. | |
| 2018/0365820 | A1 | 12/2018 | Nipe et al. | |
| 2019/0011183 | A1 * | 1/2019 | Baumert | C21C 5/565 |
| 2019/0012768 | A1 * | 1/2019 | Tafazoli Bilandi | G06V 10/82 |
| 2019/0030571 | A1 | 1/2019 | Horowitz et al. | |
| 2019/0130560 | A1 | 5/2019 | Horowitz et al. | |
| 2019/0210067 | A1 | 7/2019 | Kumar et al. | |
| 2019/0217342 | A1 | 7/2019 | Parr et al. | |
| 2019/0299255 | A1 | 10/2019 | Chaganti et al. | |
| 2019/0311230 | A1 * | 10/2019 | Mahapatra | G06V 10/454 |
| 2020/0302223 | A1 * | 9/2020 | Dutta | G06V 20/69 |
| 2021/0047132 | A1 * | 2/2021 | Sines | B65G 47/268 |
| 2021/0117729 | A1 * | 4/2021 | Bharti | G01N 15/1429 |
| 2022/0245931 | A1 * | 8/2022 | Choi | G06V 10/82 |
| 2023/0011383 | A1 | 1/2023 | Balthasar et al. | |
| 2023/0153551 | A1 * | 5/2023 | Etwaru | G06F 40/263 |
| | | | | 704/2 |
| 2024/0226963 | A1 * | 7/2024 | Tachikake | B07C 5/3422 |
| 2024/0281967 | A1 * | 8/2024 | Grimm | G06T 7/12 |
| 2024/0338826 | A1 * | 10/2024 | Arcadu | G06F 18/2414 |

FOREIGN PATENT DOCUMENTS

| | | | |
|---|---|---|---|
| CN | 106238342 | A | 12/2016 |
| CN | 206567239 | U | 10/2017 |
| CN | 107703094 | A | 2/2018 |
| CN | 107999405 | A | 5/2018 |
| DE | 102010024784 | A1 | 12/2011 |
| DE | 102015117241 | A1 | 4/2017 |
| EP | 0046624 | A1 | 3/1982 |
| JP | H 10 507003 | A | 7/1998 |
| JP | 2002540397 | A | 11/2002 |
| WO | 9606689 | A2 | 3/1996 |
| WO | 9638708 | A1 | 12/1996 |
| WO | 2006054154 | A1 | 5/2006 |
| WO | 2014037290 | A1 | 3/2014 |
| WO | 2017140729 | A1 | 8/2017 |
| WO | 2018183337 | A1 | 10/2018 |
| WO | 2019106641 | A2 | 6/2019 |

OTHER PUBLICATIONS

Extended European Search Report dated Apr. 24, 2020, issued by the European Patent Office in corresponding European Application No. 21110494. (10 pages).

Grard et al., "Object segmentation in depth maps with one user click and a synthetically trained fully convolutional network", Arxiv.org, Cornell University Library, 201 Olin Library Cornell University Ithaca, NY 14853, Jan. 4, 2018, XP081195373.

International Preliminary Report on Patentability (PCT/IPEA/409) issued on Jan. 28, 2022, by the European Patent Office as the International Searching Authority for International Application No. PCT/EP2020/080926.

International Search Report (PCT/ISA/210) and Written Opinion (PCT/ISA/237) mailed on Jan. 21, 2021, by the European Patent Office as the International Searching Authority for International Application No. PCT/EP2020/080926. (15 pages).

AMP Robotics, "The Circulars 2018 Finalist Tech Disruptor", https://www.youtube.com/watch?v=jrzdFfSN98k (Year: 2017).

Bulk Handling Systems: https://www.youtube.com/watch?v=OoXUoaN7WiY (Year: 2018).

Fanuc: https://www.youtube.com/watch?v=QbKA9uNgzYQ (Year: 2019).

Office Action (Notice of Reasons for Rejection) issued on Aug. 27, 2024, by the Japanese Patent Office in corresponding Japanese Patent Application No. 2022-524711, and an English Translation of the Office Action. (12 pages).

Office Action (The First Office Action) issued on Aug. 28, 2025, by the State Intellectual Property Office of the People's Republic of China in corresponding Chinese Patent Application No. 202080074615.2 and an English Translation of the Office Action. (19 pages).

BHS and NRT introduce Max-AI, S&P Global Commodity insights, Apr. 20, 2017, 9 pages.

Digital Sorting Technology Overview, Key Technology, Advancing Together, 2017, 29 pages.

Hyperspectral Camera, 2017, 5 pages.

Hyperspektral, Wikipedia, May 8, 2019, 2 page. (With English translation).

Impressum, Fraunhofer Verlag, 2019, 4 pages. (With English translation).

Sackewitz, M. "Leitfaden Zur Hyperspektralen Bildverarbeitung" Fraunhofer Verlag, 2019, 96 pages.

NRT Adds Max-AI® Technology to Optical Sorters, The Power of AI, Sep. 5, 2018, 4 pages.

Objekterkennung, Inhaltsverzeichnis, Wikipedia, Published on Jun. 10, 2020, 8 pages. (With English translation).

Visys Python- Smart Laser Sorter, Key Technology, Advancing Together, 2018, 2 pages.

Al-Mallahi, et al., "Discrimination Between Potato Tubers and Clods by Detecting the Significant Wavebands", Biosystems Engineering, vol. 100, Issue 3, Jul. 2008, pp. 329-337.

Al-Sarayreh, et al., "Detection of Red-Meat Adulteration by Deep Spectral—Spatial Features in Hyperspectral Images", Journal of Imaging, vol. 4, No. 5, Article No. 63, 2018, 20 pages.

Basri, et al., "Intelligent System for Automatic Classification of Fruit Defect Using Faster Region-based Convolutional Neural Network (FASTER R-CNN)", Jurnal Ilmiah KURSOR, vol. 10, No. 1, Jul. 2019, pp. 1-12.

Bigdeli, et al., "Deep Semantic Segmentation Using Nir as Extra Physical Information", IEEE International Conference on Image Processing (ICIP), 2019, pp. 2439-2443.

Binyan, et al., "Object Detection And Robotic Sorting System In Complex Industrial Environment", 2017 Chinese Automation Congress (CAC), 2017, 5 pages.

Bircanoğlu, et al., "RecycleNet: Intelligent Waste Sorting Using Deep Neural Networks", Innovations in Intelligent Systems and Applications (INISTA), 2018, 7 pages.

Bjerrum, et al., "Data Augmentation of Spectral Data for Convolutional Neural Network (CNN) Based Deep Chemometrics", Machine Learning, arXiv:1710.01927, Oct. 6, 2017, 10 pages.

Boldrini, et al., "Hyperspectral Imaging: A Review of Best Practice, Performance and Pitfalls for In-line and on-line Applications", Journal of Near Infrared Spectroscopy, vol. 20, Issue 5, 2012, pp. 483-508.

Chou, et al., "Deep-Learning-Based Defective Bean Inspection with GAN-Structured Automated Labeled Data Augmentation in Coffee Industry", Applied Sciences, vol. 9, No. 19, Article No. 4166, 2019, 26 pages.

(56) References Cited

OTHER PUBLICATIONS

Chu, et al., "Multilayer Hybrid Deep-Learning Method for Waste Classification and Recycling", Computational Intelligence and Neuroscience, vol. 2018, Article No. 5060857, Nov. 1, 2018, pp. 1-9.

Claesen, et al., "Masterthesis- Development of AI classification system for sorting food applications", Faculteit Industriele ingenieurswetenschappen master in de industrieLe wetenschappen: elektronica-ICT, 2019, 84 pages.

Costa, et al., "Artificial Intelligence in Automated Sorting in Trash Recycling", Proceedings Of The XV National Meeting On Artificial And Computational Intelligence, Oct. 2018, 9 pages,.

De-La-Torre, et al., "Multivariate Analysis and Machine Learning for Ripeness Classification of Cape Gooseberry Fruits", Processes, vol. 7. No. 12, Article No. 928, 2019, 15 pages.

Dorr, et al., "Fully-Automated Packaging Structure Recognition in Logistics Environments", 25th IEEE International Conference on Emerging Technologies and Factory Automation (ETFA), 2020, 9 pages.

Dwibedi, et al., "Cut, Paste and Learn: Surprisingly Easy Synthesis for Instance Detection", Proceedings of (ICCV) International Conference on Computer Vision, 2017, 11 pages.

Farazi, et al., "A Machine Vision Based Pistachio Sorting Using Transferred Mid-level Image Representation of Convolutional Neural Network", 10th Iranian Conference on Machine Vision and Image Processing (MVIP), 2017, pp. 145-148.

Gao, et al., "Convolutional Neural Network For Spectral ---- Spatial Classification Of Hyperspectral Images", Neural Computing and Applications, vol. 31, 2019, pp. 8997-9012.

Gao, et al., "Intelligent Fresh-tea-leaves Sorting System Research Based on Convolution Neural Network", Journal of Agricultural Machinery, vol. 48, No. 7, 2017, pp. 53-58.

Heo, et al., "Super-High-Purity Seed Sorter Using Low-Latency Image-Recognition Based on Deep Learning", IEEE Robotics and Automation Letters, vol. 3, No. 4, Oct. 2018, pp. 3035-3042.

Hong, et al., "Automatic Recognition of Coal and Gangue based on Convolution Neural Network", Computer Vision and Pattern Recognition, 2017, 10 pages.

Karbasi, et al., "Robotic Sorting of Used Button Cell Batteries: Utilizing Deep Learning", IEEE Conference on Technologies for Sustainability (SusTech), 2018, 6 pages.

Lee, et al., "Contextual Deep CNN Based Hyperspectral Classification", IEEE International Geoscience and Remote Sensing Symposium (IGARSS), 2016, pp. 3322-3325.

Li, et al., "Optical Non-Destructive Techniques for Small Berry Fruits: A Review", Artificial Intelligence in Agriculture, vol. 2, Jun. 2019, pp. 85-98.

Li, et al., "Spectral-Spatial Classification of Hyperspectral Imagery with 3D Convolutional Neural Network", Remote Sensing, vol. 9, No. 1, Article No. 67, 2017, 21 pages.

Lin, et al., "Smoother Soft-NMS for Overlapping Object Detection in X-Ray Images", Intelligence Science and Big Data Engineering. Visual Data Engineering, 2019, pp. 103-113.

Liu, et al., "Study of Shrimp Recognition Methods Using Smart Networks", Computers and Electronics in Agriculture, vol. 165, Article No. 104926, Oct. 2019, pp. 1-10.

Mahony, et al., "Deep Learning vs. Traditional Computer Vision", Advances in Computer Vision, 2019, 17 pages.

Manolakis, et al., "Hyperspectral Imaging Remote Sensing- Physics, Sensors, and Algorithms", Cambridge University Press, 2016, 4 pages.

McDonnell, et al., "Using Style-Transfer to Understand Material Classification for Robotic Sorting of Recycled Beverage Containers", 2019 Digital Image Computing: Techniques and Applications (DICTA), 2019, 8 pages.

McKinlay, Richard, "Sorting Requirements", PlastiCircle, Grant Agreement No. 730292, Apr. 17, 2018, 24 pages.

Nagaoka, et al., "Automatic Mackerel Sorting Machine Using Global and Local Features", IEEE Access, vol. 7, 2019, p. 63767-63777.

Nasiri, et al., "Image-Based Deep Learning Automated Sorting of Date Fruit", Postharvest Biology and Technology, vol. 153, Jul. 2019, pp. 133-141.

Ni, et al., "Film Sorting Algorithm in Seed Cotton Based on Near-infrared Hyperspectral Image and Deep Learning", Journal of Agricultural Machinery, vol. 50, No. 12, 2019, 24 pages. (with machine translation in German and English).

Ni, et al., "Online Sorting of the Film on Cotton Based on Deep Learning and Hyperspectral Imaging", IEEE Access, vol. 8, 2020, p. 93028-93028.

Pei, et al., "Real-time Cherry Color Grading Based on Machine Vision", IEEE International Conference on Signal, Information and Data Processing (ICSIDP), 2019, 6 pages.

Pinto, et al., "Classification of Green Coffee Bean Images Basec on Defect Types Using Convolutional Neural Network (CNN", International Conference on Advanced Informatics, Concepts, Theory, and Applications (ICAICTA), 2017, 6 pages.

Pretz, et al., "SBSC- 8th Sensor-Based Sorting & Control 2018", Shaker Verlag, 2018, 171 pages.

Raka, et al., "Taste-Wise Fruit Sorting System Using Thermal Image Processing", IEEE Pune Section International Conference (PuneCon), 2019, pp. 1-4.

Redmon, et al., "You Only Look Once: Unified, Real-Time Object Detection", Computer Vision and Pattern Recognition, arXiv:1506. 02640v5, May 9, 2016, 10 pages.

Rojas, et al., "Advances in Computational Intelligence", 16th International Work-Conference on Artificial Neural Networks, IWANN 2021, Virtual Event, Proceedings, Part II, 2021, 938 pages.

Sakr, et al., "Comparing Deep Learning and Support Vector Machines for Autonomous Waste Sorting", IEEE International Multidisciplinary Conference on Engineering Technology (IMCET), 2016, 6 pages.

Siddiqi, Raheel, "Automated Apple Defect Detection Using State-of-the-art Object Detection Techniques", SN Applied Sciences, vol. 1, Article No. 1345, 2019, 12 pages.

Sousa, et al., "Automation of Waste Sorting with Deep Learning", XV Workshop on Computer Vision (WVC), 2019, pp. 43-48.

Veeramani, et al., "DeepSort: Deep Convolutional Networks for Sorting Haploid Maize Seeds", BMC Bioinformatics, vol. 19(Suppl 9), Article No. 289, Aug. 13, 2018, 9 pages.

Wang, et al., "Auto-Sorting System Toward Smart Factory Based on Deep Learning for Image Segmentation", IEEE Sensors Journal, vol. 18, No. 20, Oct. 15, 2018, pp. 8493-8501.

Wanjala, Judith, "Steinert KSS Multi-sensor Sorting System: Versatile Performer Of Numerous Sorting Tasks", Recycling International, Sep. 27, 2019, 3 pages.

Wu, et al., "Semantic Segmentation of Mechanical Parts Based on Fully Convolutional Network", 9th International Conference on Modelling, Identification and Control (ICMIC), 2017, pp. 612-617.

Zhao, et al., "A High Throughput Integrated Hyperspectral Imaging and 3D Measurement System", Sensors, vol. 18, No. 4, Article No. 1068, Apr. 2, 2018, 17 pages.

Communication of a Notice of Opposition dated Sep. 22, 2025, issued in European Patent Application No. 20799709.9 (7 pages).

Communication of a Notice of Opposition dated Oct. 7, 2025, issued in European Patent Application No. 20799709.9 (10 pages).

Communication of a Notice of Opposition dated Oct. 7, 2025, issued in European Patent Application No. 20799709.9 (7 pages).

Communication of a Notice of Opposition dated Oct. 8, 2025, issued in European Patent Application No. 20799709.9 (6 pages).

* cited by examiner

Fig. 3a                    Fig. 3b

NEURAL NETWORK FOR BULK SORTING

CROSS-REFERENCE TO RELATED APPLICATIONS

This application is a continuation of U.S. patent application Ser. No. 17/773,319, filed Apr. 29, 2022, which is a U.S. National Stage Application of PCT/EP2020/080926, filed on Nov. 4, 2020, which claims priority to European Patent Application No. 19206887.2, filed on Nov. 4, 2019, the entire contents of all of which are hereby incorporated by reference.

TECHNICAL FIELD

The present invention relates to the field of sorting. More particularly, the present invention relates to bulk sorting aided by a convolutional neural network (CNN).

BACKGROUND

Sorting is a topical field of research with implications for e.g. recycling, mining or food processing. For a recycling implementation, sorting techniques are used to sort a mixture of garbage into the correct recycling bin. As technology evolves, this sorting may be done more accurately and faster than before.

There exists techniques such as those shown in US 2018/243800 AA, for using a machine learning system for sorting a stream of single objects. The machine learning system allows for an accurate identification of the objects being sorted. However, such techniques are slow as they may only process a single stream of objects at a time. Other examples of material characterization and segmentation techniques may be found in US 2019/130560 A1 and Matthieu Grard et al: "Object segmentation in depth maps with one user click and a synthetically trained fully convolutional network", 2018.

Current sorters separate individual particles. They require careful feed preparation so that individual particles may be detected and measured, and ejection is usually achieved by blasts of compressed air. Therefore, current sorters have very low capacity (up to 300 tonnes per hour for larger particles and much less for smaller particles), making them non-viable for higher tonnage pre-concentration or so-called bulk sorting. The sorting speed and throughput to be achieved in bulk sorting is directly related to the size of the objects to be sorted. In general, sorting speed and throughput greatly varies for larger and smaller articles and is much dependent on the particular application which may range from food, paper, wood, plastic and mineral sorting applications.

To make sorting viable for all pre-concentrations, it should be applied to bulk quantities of objects, such as on a loaded truck tray or a fully loaded conveyor belt.

There is thus a need for improvements within this context.

SUMMARY

Thusly, the present invention strives to solve at least some of the above problems and to eliminate or at least mitigate some of the drawbacks of prior-art systems. This object has now been achieved in accordance with the invention by the novel technique set forth in the appended independent claims; preferred embodiments being defined in the related dependent claims.

A further object of the present invention is to provide a sorting system capable of sorting objects in bulk. According to a first aspect, the above and other objects of the invention are achieved, in full or in part, by a bulk sorting system for sorting objects in bulk. The system comprises: at least one radiation source arranged to radiate the objects, at least one optical sensor arranged to capture reflected radiation of the objects and acquire the reflected radiation as multi- or hyperspectral data; a processing circuit configured to analyze the reflected radiation of the objects by inputting the multi- or hyperspectral data into a convolutional neural network (CNN) with at least two convolutional layers in order to either detect and classify the objects in the multi- or hyperspectral data and/or semantically segment the multi- or hyperspectral data; and a mechanical sorter configured to sort the objects using the analysis of the processing circuit.

This is beneficial in that previous problems such as objects laying on top of each other, thus obstructing sensor data, may be identified and processed accordingly. The CNN with at least two convolutional layers may advantageously be trained to handle this type of multi- or hyperspectral data in an improved way compared to known sorting systems for bulk sorting. The detection and classification and/or semantic segmentation with the CNN allows performing object processing with overlapping objects, which leads to higher possible sorter throughput per hour compared to traditional processing methods.

In one embodiment, the at least one optical sensor comprises a near-infrared scanner arranged to scan the objects, wherein the multi- or hyperspectral data comprises the scan data.

The NIR scanner is beneficial in that a lot of distinctive information may be extracted from measured NIR absorption of the objects.

In one embodiment, the at least one optical sensor comprises an image sensor arranged to capture image data of the objects, wherein the multi- or hyperspectral data comprises the image data.

The image sensor is beneficial in that many image processing algorithms exists for image data, such as object recognition or image segmentation. Moreover, a CNN is typically well suited for analysis of image data.

In one embodiment, the at least one optical sensor comprises a hyperspectral camera arranged to scan the objects, wherein the multi- or hyperspectral data comprises the scan data.

The hyperspectral camera is beneficial in that it is an efficient way to gather a lot of data to be used by the CNN.

In one embodiment, the at least one optical sensor comprises a laser triangulator arranged to measure 3D-data of the objects, wherein the multi- or hyperspectral data comprises the 3D-data, wherein the measurement of 3D-data may comprise laser height intensity scanning.

The laser triangulator is beneficial in that it allows a precise 3D-measurement, which is beneficial for the analysis of the CNN.

In one embodiment, the system further comprises an electromagnetic detector arranged to measure electromagnetic properties of the objects, wherein the processing circuit is further configured to analyze the electromagnetic properties by inputting the measured electromagnetic properties into the CNN in order to either detect and classify the objects in the multi- or hyperspectral data and/or semantically segment the multi- or hyperspectral data.

The electromagnetic detector is beneficial in that classification of certain types of objects, such as metals and isolators, is much more precise using electromagnetic properties.

In one embodiment, the at least one optical sensor comprises a laser scanner with a rotating polygon mirror arranged to measure laser scatter and/or anti-scatter properties of the objects; wherein the multi- or hyperspectral data comprises the laser scatter and/or anti-scatter properties.

The laser scanner is beneficial in that a lot of distinctive information may be extracted from measured laser scatter and/or anti-scatter properties of the objects. The rotating polygon mirror allows several objects and scattering characteristics in different directions to be measured without any targeting.

In one embodiment, the at least one optical sensor comprises a pulsed LED emitter arranged to measure light anti-scatter properties of the objects; wherein the multi- or hyperspectral data comprises the light anti-scatter properties.

The LED emitter is beneficial in that they require little maintenance and calibration and generate relatively little heat. A lot of distinctive information may be extracted from measured light anti-scatter properties of the objects.

In one embodiment, the at least one optical sensor comprises an X-ray camera arranged to measure X-ray transmission of the objects; wherein the multi- or hyperspectral data comprises the X-ray transmission of the objects, respectively.

The X-ray camera is beneficial in that different properties may be measured at once. The permittivity of the objects to X-ray radiation may indicate their atomic density and/or their thickness. The result of X-ray fluorescence is information about presence of elements and their concentration.

In one embodiment, the system further comprises conveying the objects along detection range(s) of the at least one optical sensor to the mechanical sorter using a conveyor belt.

The conveyor belt is beneficial in that it allows stable, fast and predictable motion of the objects. An alternative to the conveyor belt is a chute.

In one embodiment, the mechanical sorter is further configured to separate the objects into at least two streams and/or to eject unwanted objects from the bulk.

The separation of the objects is beneficial in that several sets of objects may be wanted from the bulk. The ejection of unwanted objects is beneficial in that there is frequently unwanted objects in the bulk that interfere with future processes.

In one embodiment, the mechanical sorter comprises at least one valve arranged to eject at least one air stream that pushes the objects to a desired position.

The at least one valve is beneficial in that it is an energy efficient and precise way to push objects. The valves are preferably solenoid valves, as they have relatively short switching times and a relatively high throughput performance.

In one embodiment, the mechanical sorter comprises at least one mechanical kicker arranged to kick the objects to a desired position.

The at least one mechanical kicker is beneficial in that it is an energy efficient and powerful way to push objects. The kickers are preferably pneumatic.

In one embodiment, the mechanical sorter is arranged to sort the objects as they travel along a conveyor belt, as they travel along a chute or as they freefall.

The sorting while travelling is beneficial in that it is efficient in terms of speed. The sorter may be arranged near the conveyor belt and arranged to move the objects in a direction perpendicular to the direction of motion of the conveyor belt. The chute or freefall may be arranged at an end of a conveyor belt or along an edge of a conveyor belt. It is preferential that the mechanical sorter is capable of reacting quickly as the velocity of the objects are relatively hard to predict and control in this embodiment. In one embodiment, the mechanical sorter has an activation precision of less than 1 ms for small particles and less than 10 ms for bigger particles, such as bottles.

In one embodiment, the mechanical sorter is arranged to sort the objects such that different overlapping and/or stacked objects, as analyzed by the processing circuit, are separated.

The separation of overlapping and/or stacked objects is beneficial in that different objects may be treated differently despite being overlapping and/or stacked, which increases accuracy and yield of the sorting.

In one embodiment, the mechanical sorter is arranged to sort the objects such that different overlapping and/or stacked objects, as analyzed by the processing circuit, are treated as a single group of objects.

The grouping of overlapping and/or stacked objects is beneficial in that it may be difficult to separate them, especially with certain mechanical sorters.

In one embodiment, overlapping and/or stacked objects are treated as a single group of objects, wherein for a group of objects comprising at least a first object type and a second object type, the mechanical sorter is configured to sort the group of objects as either the first object type or the second object type based on a preference in the bulk sorting system.

The sorting of a group as a single object type is beneficial in that depending on the embodiment, it may be more valuable to ensure that none of the wanted material is ejected or that no unwanted material is kept. In the first case, the group would be sorted as the wanted object type and in the second case, the group would be sorted as the unwanted object type.

In one embodiment, the mechanical sorter is arranged to target the center of gravity or boundaries of the objects, as analyzed by the processing circuit.

The targeted mechanical sorting is beneficial in that it allows the mechanical sorter to be more efficient in that e.g. fewer valves or kickers are used and the objects are moved without rotating, which increases accuracy and lowers energy consumption. For example, a third of mechanical sorters may be used for the same result if they are targeted better.

Object sorting, depending on the size of the objects to be sorted, at a speed of between 0.4-20 m/s and a throughput of 0.5-30 tons/hr at an accuracy level of higher than 80%, preferably higher than 90% with a single stage throughput and higher than 95%, preferably higher than 99% with a cascade of sorting systems that may be achieved with the sorting system and method of present application.

In one embodiment, the CNN comprises at least two pooling layers.

The pooling layers are beneficial in that they reduce the size of the neural network by down-sampling the data, which makes the CNN more efficient. The CNN may have any number of pooling layers, including 3, 5, 10, 20, 100, 250, etc.

In one embodiment, the system further comprises post-processing the classified and/or segmented multi- or hyperspectral data to configure the mechanical sorter before sorting occurs.

The post-processing is beneficial in that it allows converting of the output into something the mechanical sorter may more easily interpret. This may comprise configuration instructions for the mechanical sorter to be created before sorting occurs of the objects corresponding to the classified and/or segmented multi- or hyperspectral data.

In one embodiment, the processing circuit is further configured to input at least a part of the multi- or hyperspectral data into a pattern recognition algorithm; and wherein the results of both the CNN and the pattern recognition algorithm are used by the mechanical sorter to sort the objects.

The pattern recognition is beneficial in that it is well established and may enhance the result of the CNN. It also does not require any training and may be completed relatively quickly, which may be used if the CNN is unavailable or too slow. Such a hybrid computation has unexpected synergistic benefits as different information may be obtained by the different analysis methods.

According to a second aspect, the above and other objects of the invention are achieved, in full or in part, by a method for sorting objects in bulk. The method comprises steps of: radiating the objects using at least one radiation source; capturing reflected radiation of the objects using at least one optical sensor; acquiring the reflected radiation as multi- or hyperspectral data; analyzing the reflected radiation of the objects by inputting the multi- or hyperspectral data into a convolutional neural network (CNN) with at least two convolutional layers in order to either detect and classify the objects in the multi- or hyperspectral data and/or semantically segment the multi- or hyperspectral data; and sorting, by a mechanical sorter, the objects using the results of the analysis step.

This is beneficial in that previous problems such as objects laying on top of each other, thus obstructing sensor data, may be identified and processed accordingly. The detection and classification and/or semantic segmentation with the CNN allows performing object processing with overlapping objects, which leads to higher possible sorter throughput per hour compared to traditional processing methods. The sorter throughput per hour may be increased by at least 50% compared to traditional processing methods. Object sorting, depending on the size of the objects to be sorted, at a speed of between 0.4-20 m/s and a throughput of 0.5-30 tons/hr may be achieved.

In one embodiment, the method further comprises a step of post-processing the classified and/or segmented multi- or hyperspectral data to configure the mechanical sorter before the sorting step.

The post-processing step is beneficial in that it allows converting of the output into something the mechanical sorter may more easily interpret. This may comprise configuration instructions for the mechanical sorter to be created before the sorting step of the objects corresponding to the classified and/or segmented multi- or hyperspectral data.

Other objectives, features and advantages of the present invention will appear from the following detailed disclosure, from the attached claims, as well as from the drawings. It is noted that the invention relates to all possible combinations of features.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise.

BRIEF DESCRIPTION OF THE DRAWINGS

By way of example, embodiments of the present invention will now be described with reference to the accompanying drawings, in which.

DETAILED DESCRIPTION

Figure 1:
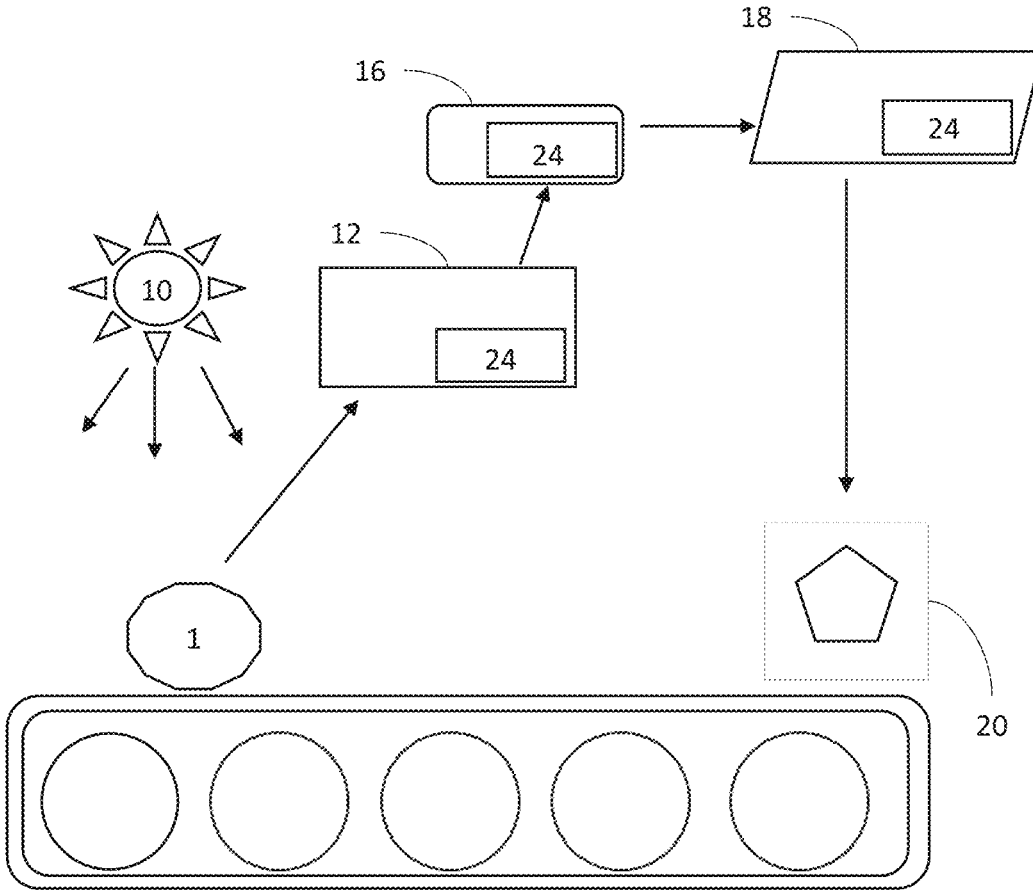
FIG. 1 shows a bulk sorting system according to an embodiment.

Embodiments of the invention will now be described with reference to the accompanying drawings. The invention may, however, be embodied in many different forms and should not be construed as limited to the embodiments set forth herein. Rather, these embodiments are provided so that this disclosure will be thorough and complete and will fully convey the scope of the invention to those skilled in the art. The terminology used in the detailed description of the particular embodiments illustrated in the accompanying drawings is not intended to be limiting of the invention. In the drawings, like numbers refer to like elements.

Figure 2:
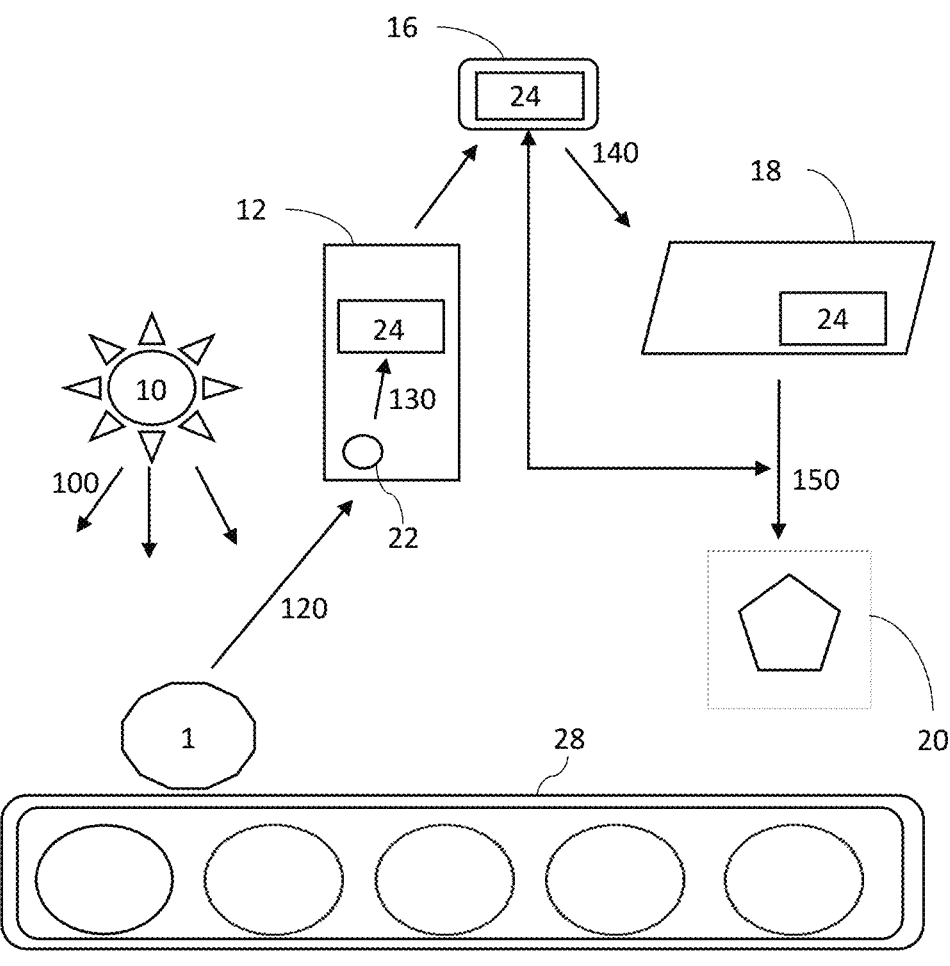
FIG. 2 shows a bulk sorting system according to an embodiment.

Starting in FIGS. 1 and 2, a bulk sorting system is shown, wherein FIG. 2 shows a more detailed example of the same bulk sorting system as in FIG. 1. The system is configured to sort objects 1 in bulk. Objects 1 in bulk may comprise a relatively large number of objects 1 that are randomly spatially separated. Objects 1 in bulk are traditionally not a single stream, but instead an unsorted set with objects 1 that may overlap. Bulk sorting traditionally aims to separate a specific set or sets of objects 1 from other objects 1, i.e. that some objects are wanted, and other objects are unwanted. One example is to separate plastic from other types of garbage, so that the plastic may be recycled.

The system comprises at least one radiation source 10 arranged to radiate the objects 1. The radiation source 10 may be an LED, a light bulb, a laser, an X-ray emitter and/or any other suitable radiation source. The radiation source 10 may be arranged as different units, as ambient illumination and/or to radiate in different directions.

The system further comprises at least one optical sensor 12 arranged to capture reflected radiation 22 of the objects 1 and acquire the reflected radiation 22 as multi- or hyperspectral data 24. The multispectral data 24 may be a multi-dimensional image where each pixel or equivalent (such as super pixel or grouping of pixels) comprises a few bands (order of magnitude 1-10) with narrow or wide wide spectrums (order of magnitude 100-1000 nm). The hyperspectral data 24 may be a multi-dimensional image where each pixel or equivalent (such as super pixel or grouping of pixels) comprises many bands (order of magnitude 4-500) with narrow spectrums (order of magnitude 1-50 nm).

The system further comprises a processing circuit 16 configured to analyze the reflected radiation 22 of the objects 1 by inputting the multi- or hyperspectral data 24 into a convolutional neural network (CNN) 18 with at least two convolutional layers in order to either detect and classify the objects 1 in the multi- or hyperspectral data 24 and/or semantically segment the multi- or hyperspectral data 24. More than two convolutional layers may be used, such as 3, 5, 10, 20, 100, 250, etc.

The processing circuit 16 is configured to carry out operations and functions of the bulk sorting system. Operations may be main procedures of the bulk sorting system, whereas the functions may be forming part of an operation. Hence, each function may be a sub-procedure of an operation.

The processing circuit 16 may include a processor, such as a central processing unit (CPU), microcontroller, microprocessor, field-programmable gate array (FPGA), graphic card, or special hardware for CNNs. The processing circuit 16 is configured to execute program code stored in a memory, in order to carry out the operations and functions of the bulk sorting system.

Operations and functions of the bulk sorting system may be embodied in the form of executable logic routines (e.g., lines of code, software programs, etc.) that are stored on a non-transitory computer readable medium (e.g., the memory) of the bulk sorting system and are executed by the processing circuit 16 (e.g., using the processor). Furthermore, the operations and functions of the bulk sorting system may be a stand-alone software application or form a part of a software application that carries out additional tasks related to the bulk sorting system. The described operations and functions may be considered a method that the corresponding device is configured to carry out. Also, while the described operations and functions may be implemented in software, such functionality may as well be carried out via dedicated hardware or firmware, or some combination of hardware, firmware and/or software.

The CNN 18 is a neural network with at least two convolutional layers. The neural network 18 has an input of the multi- or hyperspectral data 24 and an output of the multi- or hyperspectral data 24 with objects detected and classified and/or semantically segmented. An example of the output may be seen in FIGS. 3a-b.

The CNN 18 may further comprise at least two pooling layers. The pooling layers reduces the size of the neural network by down-sampling the data. This makes the CNN 18 more efficient.

Detecting and classifying objects in the multi- or hyperspectral data 24 comprises using the CNN 18 (optionally in conjunction with pre-processing, see further below) to classify different parts of the multi- or hyperspectral data 24 as different objects 1. The objects 1 may further be analyzed and classified into different sets, such as based on the material that the objects 1 are most likely made of. The different sets may further be identified as wanted or unwanted, in order to enable bulk sorting such as ejection of unwanted objects 1.

Semantically segmenting objects in the multi- or hyperspectral data 24 comprises using the CNN to classify each pixel of the multi- or hyperspectral data 24. The classification may comprise separation into different sets, such as based on the material that the pixel is most likely made of. The different sets may further be identified as wanted or unwanted (either by the CNN 18 or in conjunction with pre-processing, see further below), in order to enable bulk sorting such as ejection of unwanted objects 1.

Figure 3:
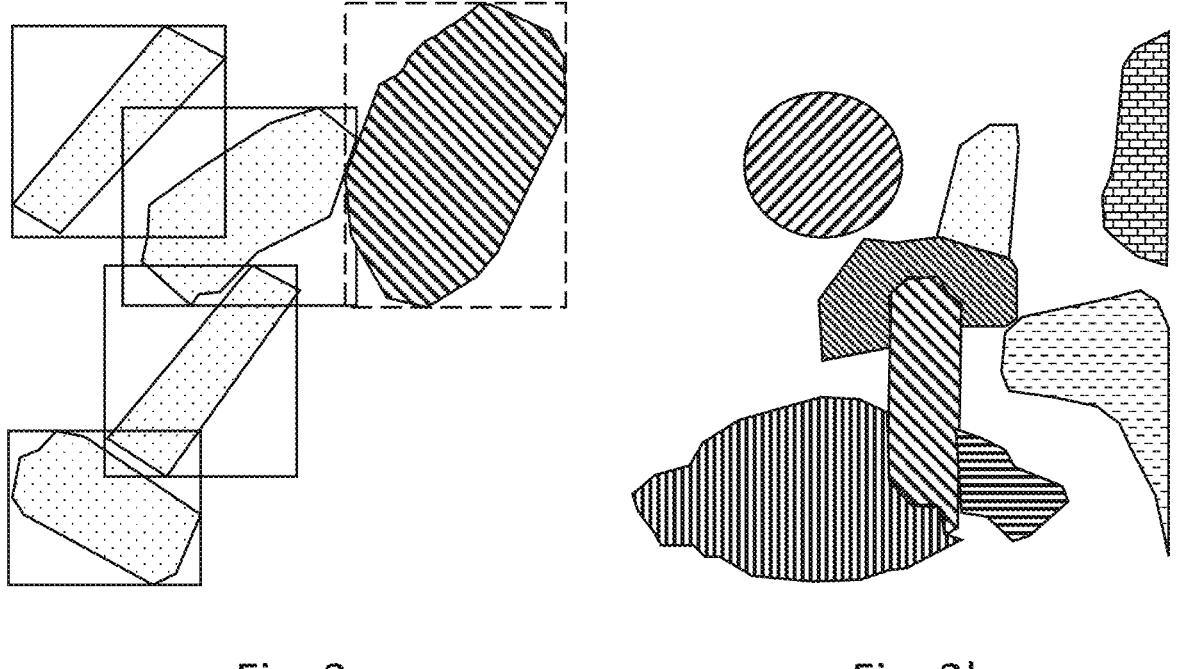
FIG. 3a shows a result of object detection according to an embodiment.
FIG. 3b shows a result of semantic segmentation according to an embodiment.

FIG. 3a shows multi- or hyperspectral data with detected and classified objects. The detection is shown as boxes around the objects and the classification is shown as patterns of the objects. The detected objects are classified into two sets, wanted and unwanted. The unwanted set is shown as a lined pattern with a dashed box and the wanted set is shown as a dotted pattern with a solid box.

FIG. 3b shows multi- or hyperspectral data with semantically segmented objects. Each pixel or equivalent is classified into a set, for example based on the material of the objects according to the CNN. Background pixels or equivalents are classified as such and disregarded by the mechanical sorter. Each object is segmented and given a different pattern. The patterns may correspond to a classification. Some objects are overlapping, and the CNN has managed to differentiate them as different objects and given them different patterns. The mechanical sorter may be instructed to process these as different objects or a single group of objects, and they may be classified accordingly.

The system further comprises a mechanical sorter configured to sort the objects using the analysis of the processing circuit. The mechanical sorter may be at least one valve, mechanical kicker, robot arm or any other suitable device capable of mechanically moving objects.

The at least one valve is arranged to eject at least one air stream that pushes the objects to a desired position. The desired position may be a different part of the bulk, a chute or container arranged in the direction of the at least one valve or simply of the bulk sorting system. The at least one valve is preferably a solenoid valve, as they have relatively short switching times and a relatively high throughput performance.

The valves may be arranged in an array with a distance between valves in an order of magnitude from mm to cm. In one embodiment, the bulk sorting system comprises at least 10 valves per meter. In other embodiments, more than 10 (such as 12, 15, 20, 100, 250, etc.,) valves per meter is employed. More than one valve may be activated at once depending on the size and/or weight of the object, as identified by the CNN.

The at least one mechanical kicker is arranged to kick the objects to a desired position. The desired position may be a different part of the bulk, a chute or container arranged in the direction of the at least one mechanical kicker or simply of the bulk sorting system. The kickers may be electro-mechanical, pneumatic, spring-loaded and/or hydraulic, wherein the kickers are preferably pneumatic. In one embodiment, the bulk sorting system comprises at least 10 kickers per meter. In other embodiments, more than 10 (such as 12, 15, 20, 100, 250 etc.,) kickers per meter is employed.

The objects are sorted using the analysis of the processing circuit. This may comprise directing the mechanical sorter to the objects identified by the CNN. This may further comprise sorting the objects according to the set the object belongs to, the set being identified by the CNN.

The mechanical sorter may be configured to separate the objects into at least two streams. This allows the bulk sorting system to sort objects in bulk into several streams, wherein each stream may e.g. comprise a specific set of objects. As an example, bulk garbage may be sorted into a stream of plastic, a stream of metal and a stream of other materials, wherein each stream is directed or conveyed to different places. The system may be used for bulk sorting of food and mining materials in a similar manner.

The mechanical sorter may be configured to eject unwanted objects from the bulk. This allows the bulk sorting system to remove unwanted objects from the bulk. Ejected objects may be sorted into a specific container or removed from the rest of the objects.

Figure 4:
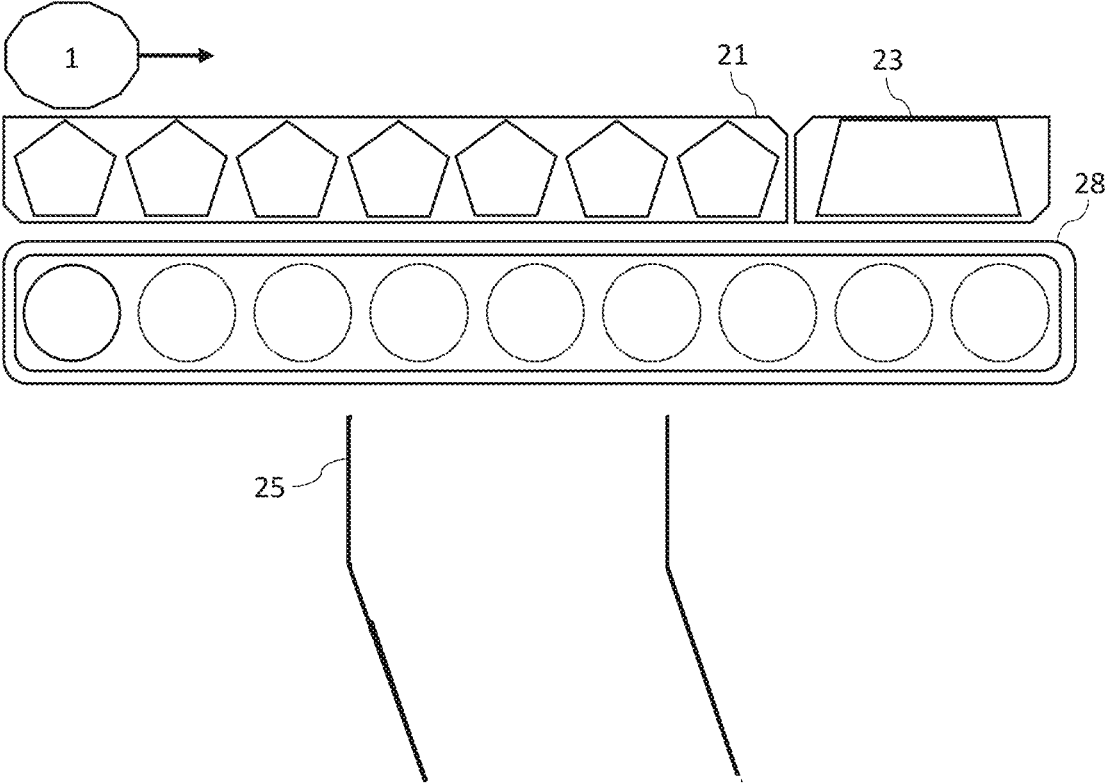
FIG. 4 shows a mechanical sorter according to an embodiment.

FIG. 4 shows an embodiment of a mechanical sorter that comprises an array of valves 21 and one mechanical kicker 23. Several valves of the array are arranged opposite a chute 25. The chute is intended for separating a specific set of objects from the rest of the bulk. When such an object is classified by the CNN, the processing circuit may be configured to instruct a number of the valves opposite the chute to activate when the classified object passes by the valves, the number being proportional to the size and/or weight of the object, as identified by the CNN or using the output from the CNN.

The mechanical kicker of this mechanical sorter is arranged such that if any unwanted object is too big and/or heavy to be moved by the array of valves, they may be ejected by the mechanical kicker before being moved beyond the mechanical sorter.

The bulk sorting system may further comprise conveying the objects along detection range(s) of the at least one optical sensor to the mechanical sorter using a conveyor belt 28. The objects may be conveyed in any number of ways, such as Brownian motion, fluid conveyance or air stream conveyance, however the inventors have found that the conveyor belt is most efficient and does not interfere with the optical measurement or sorting. The conveyor belt may have a speed of approximately 2.5-3 m/s.

Other embodiments have the ejectors placed on the same side as the chute is placed, alternatively sort in free fall or use conveyor belts for material transport between detection and ejection.

The mechanical sorter may be arranged to sort the objects as they travel along the conveyor belt. The sorter may be arranged near the conveyor belt and arranged to move the objects in a direction perpendicular to the direction of motion of the conveyor belt.

The mechanical sorter may be arranged to sort the objects as they travel along a chute or as they freefall. The chute or freefall may be arranged at an end of a conveyor belt or along an edge of a conveyor belt. It is preferential that the mechanical sorter is capable of reacting quickly as the velocity of the objects are relatively hard to predict and control in this embodiment. In one embodiment, the mechanical sorter has an activation precision of less than 1 ms for small particles and less than 10 ms for bigger particles, such as bottles. The sorting may e.g. comprise moving the objects to a desired position such that wanted objects chute or fall into a different container than unwanted objects.

The mechanical sorter may be arranged to sort the objects such that different overlapping and/or stacked objects, as analyzed by the processing circuit, are separated. As bulk sorting does not usually comprise any pre-sorting, overlapping and/or stacked objects are possible and quite common. The processing circuit may identify these objects, preferably using the CNN. Once identified, the mechanical sorter may be instructed or influenced by the processing circuit to separate the objects. This may comprise e.g. opening an air valve for a precise time and at a precise moment.

The mechanical sorter may be arranged to sort the objects such that different overlapping and/or stacked objects, as analyzed by the processing circuit, are treated as a single group of objects. As bulk sorting does not usually comprise any pre-sorting or pre-processing to form a single stream of separated objects, overlapping and/or stacked objects are possible and quite common. The processing circuit may identify these objects, preferably using the CNN.

Once identified, the mechanical sorter may not be capable or willing to separate the objects, which may in turn depend on the mode of operation that the processing circuit is in. As such, the different overlapping and/or stacked objects are treated as a single grouping that is processed as a single object. This processing may comprise e.g. ejecting the group if it comprises any unwanted object or conserving the group if it comprises a sufficient portion of wanted objects, measured using suitable measurements such as weight percentage or volume. Which action is taken and whether wanted or unwanted objects are prioritized may depend on settings or a use mode of the processing circuit/bulk sorting system. In other words, in one embodiment, overlapping and/or stacked objects are treated as a single group of objects, wherein for a group of objects comprising at least a first object type and a second object type, the mechanical sorter is configured to sort the group of objects as either the first object type or the second object type based on a preference in the bulk sorting system.

In one embodiment, the neural network is not handling overlapping objects in a different way than separated objects. However the neural network is forced to learn to separate overlapping objects by giving negative feedback in the training process if overlapping objects are merged, only partly found or not all found. To handle this difficult task a lot of sample images with overlapping objects and corresponding labels (describing the contours of the touching and overlapping objects) may be provided during training of the CNN.

A process known as data augmentation is used to increase the sample size, classically by rotations, small scale changes, color changes, crops and others applied to the whole image. To generate a lot more different overlaps, a special augmentation technique is used for the conveyer belt setup. By labelling object instances in all the captured training data with their class and surrounding contour, the images in the training process may be used as they were captured and with the previously described standard augmentation in the following novel way:

Starting with images captured from the conveyer belt without objects, the labelled object instances are placed on this image and allowed to overlap. Objects which are completely covered by others are removed from the labelled ground truth of the newly augmented image.

If an object is placed at least partly on another object, the new image information in this area has to be generated according to the sensor properties—e.g.: for NIR, VIS and RGB data the information of the object on top overwrites the previously existing information, for X-ray data the Beer-Lamber law is applied and for laser data a 3D height profile is calculated for the two objects and the scatter as well intensity value of the top object are used.

The mechanical sorter may be configured to work differently depending on the analysis of the processing circuit. For example, a large and light-weight object, as analyzed by the processing circuit, will only use a portion of the possible ejectors as not all are needed for a light-weight object and thereby energy is conserved. In the embodiment with an air valve array, only half of the air valves that cover the object are used, thus both conserving energy and generating less turbulence. In a reciprocal manner, the mechanical sorter may use a larger portion of possible ejectors than usual to increase the yield of the sorters and decrease the precision of the sorting, which may be beneficial for heavy objects.

For mechanical sorters with variable strength, this may further be adjusted based on the analysis of the processing circuit. Accordingly, light-weight objects may use less strength than heavy-weight objects.

Further, the analysis of the processing circuit may be used to find the centre of gravity or boundaries of the objects and affect the mechanical sorter to target these areas. This may be beneficial to increase the efficiency of the sorter and may further be necessary for certain types or sorters that require sophisticated targeting.

Further, if the position of objects is not stable, it may be beneficial to increase the number of ejectors activated and the time window for ejection to compensate for unpredictable movement.

Figure 5A:
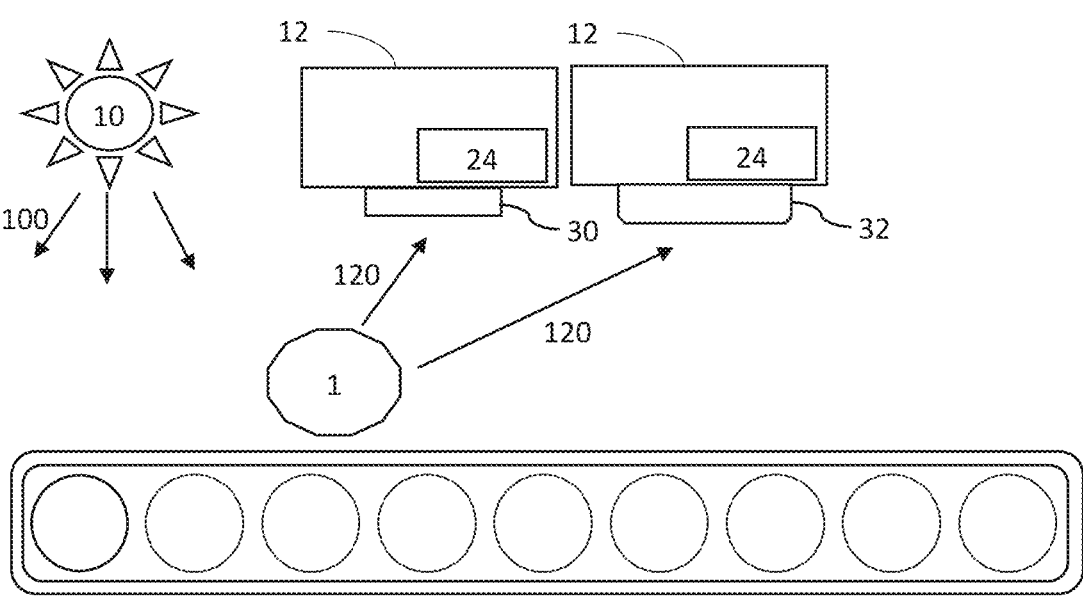
FIG. 5a shows a bulk sorting system comprising a near-infrared scanner and an image sensor according to an embodiment.

In FIG. 5a, a bulk sorting system comprising a near-infrared (NIR) scanner 30 arranged to scan the objects and an image sensor 32 arranged to capture image data of the objects is shown. The multi- or hyperspectral data that is input into the CNN comprises the scan and image data. While several types of optical sensors are shown to be used in tandem in FIG. 5a and other figures, each optical sensor may operate independently or together with any other optical sensor. The optical sensors may further be arranged to measure the radiation of the radiation source or comprise a separate radiation source.

The NIR scan comprises spectroscopic data regarding the absorption of the objects of this wavelength range. Other wavelengths may be used as a replacement or in addition to the NIR range, such as visible light, ultra-violet (UV) light or X-rays. The NIR light may be provided by the radiation source or a separate source. The scan may be represented as multi- or hyperspectral data by acquiring a separate spectrum for each pixel or equivalent of the scanned area.

The image data comprises e.g. RGB pixel values of the reflected color of the objects. This may be used for traditional image processing by the processing circuit, such as object recognition or image segmentation. The objects may be illuminated by the radiation source to enable the measurement of the image data. The image data may be represented as multi- or hyperspectral data by acquiring a separate value of the amount of red, green and blue in each pixel or equivalent of the scanned area.

Figure 5B:
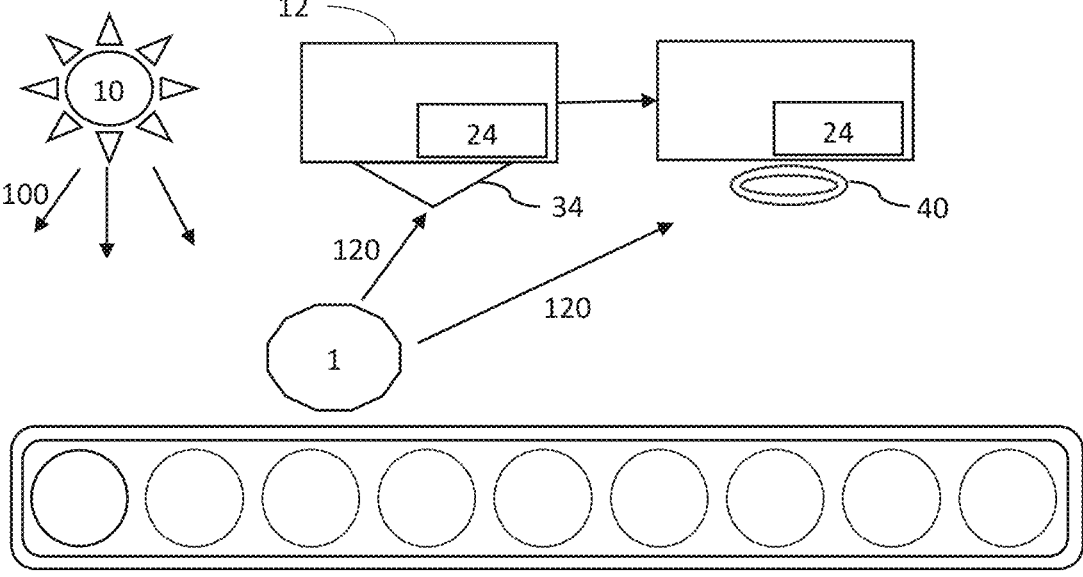
FIG. 5b shows a bulk sorting system comprising a laser triangulator and an electromagnetic detector according to an embodiment.

In FIG. 5b, a bulk sorting system comprising a laser triangulator 34 arranged to measure 3D-data of the objects and an electromagnetic detector 40 arranged to measure electromagnetic properties of the objects is shown. The multi- or hyperspectral data that is input into the CNN comprises the 3D-data and electromagnetic properties. Note that the electromagnetic detector is not an optical sensor, however it may be combined with any optical sensor to acquire data from the objects to be input as multi- or hyperspectral data into the CNN.

The 3D-data may be measured using laser height intensity scanning. This comprises a laser directed towards the objects and a collector, such as a camera, measuring the intensity of the laser. The collector is arranged to measure the intensity from the surface the laser is directed towards to 10-20 cm above the surface. This allows the collector to detect where the laser hits the objects, as this will impact its intensity as the object disrupts the path of the laser.

The laser is preferably a line laser arranged across the width of the surface that carries the objects, perpendicular to the direction of motion of the objects. As such, an entire object may be measured at once. The laser may be the radiation source or provided separately.

The collector may comprise a band pass filter to filter out ambient light, such that only the intensity of the laser wave lengths is measured.

The 3D-data comprises e.g. mapping of the height of the objects. The 3D-data may be represented as multi- or hyperspectral data by acquiring a height value of each pixel or equivalent of the scanned area.

The electromagnetic properties may be measured using e.g. characteristics of reflection of applied electromagnetic waves or a conduction of an applied current. This may be used for e.g. detecting metallic objects. Arrays of single coils are used for detection of metal and arrays of balanced coils for distinguishing of different metal types.

It may not be possible to directly allocate measured electromagnetic properties to specific pixels to the degree of accuracy as with optical measurements. The allocation may therefore be estimated, possibly with the use of optical data to differentiate between objects. The electromagnetic properties may be represented as multi- or hyperspectral data by allocating measured electromagnetic properties to estimated pixels or equivalent of the scanned area.

In the embodiment of FIG. 5b, the electromagnetic detector uses multi- or hyperspectral data from the laser triangulator in order to allocate measured electromagnetic properties the multi- or hyperspectral data with improved accuracy of the allocation. The communication of the multi- or hyperspectral data to the electromagnetic detector is shown directly from the laser triangulator, however it may occur through the processing circuit.

The allocation of the measured electromagnetic properties to the multi- or hyperspectral data may alternatively occur separately in the processing circuit after some or all of the measured electromagnetic properties and multi- or hyperspectral data have been collected and before they are input into the CNN.

Figure 6A:
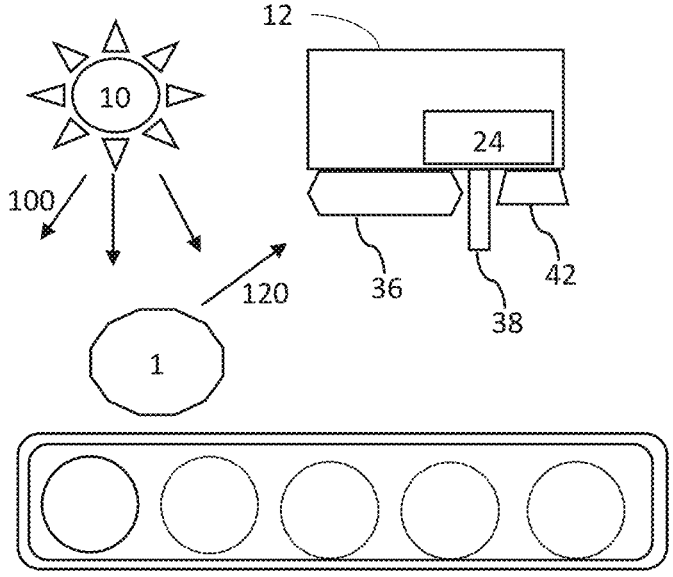
FIG. 6a shows a bulk sorting system comprising a laser scanner, a pulsed LED emitter and an X-ray camera according to an embodiment.

In FIG. 6a, a bulk sorting system comprising a laser scanner 36 with a rotating polygon mirror arranged to measure laser scatter and/or anti-scatter properties of the objects, a pulsed LED emitter 38 arranged to measure light anti-scatter properties of the objects and an X-ray camera 42 arranged to measure X-ray transmission of the objects is shown. The multi- or hyperspectral data that is input into the CNN comprises the laser scatter and/or anti-scatter properties, the light anti-scatter properties and the X-ray transmission of the objects.

The different optical sensors are shown as a single unit in FIG. 6a; however, they may be any number of units.

The laser scatter and/or anti-scatter properties of the objects comprises information of the reflectivity and absorption of the emitted laser light. This may e.g. be used for object recognition. The laser scatter and/or anti-scatter properties of the objects may be represented as multi- or hyper-spectral data by acquiring the laser scatter and/or anti-scatter properties of each pixel or equivalent of the scanned area.

The laser scatter and/or anti-scatter properties of the objects are measured using a detector arranged to measure the intensity of the laser light reflected by the objects.

The laser scanner with a rotating polygon mirror emits a point laser into the rotating polygon mirror that reflects the laser in different directions. This allows several objects and scattering characteristics in different directions to be measured without any targeting. The laser may have any wavelength and a combination of several wavelengths or may alternate between different wavelengths. The laser may be considered as the radiation source or be provided separately. The receiver might be configured to measure the reflected laser light, the scattered laser light or both. Alternatively, the receiver may measure florescence effects in the objects caused by the laser.

The LED emitter may be configured to emit several different wavelengths, such as six different colors. The LED emitter is preferably pulsed, such that each color is emitted as a separate pulse. The LED emitter may be considered as the radiation source or be provided separately. LED emitters are beneficial in that they require little maintenance and calibration and generate relatively little heat.

The light anti-scatter properties of the objects are measured by a detector, such as a linescan detector, preferably an InGaAs linescan detector, that measures the intensity of reflected LED light. The light anti-scatter properties for each emitted color and background without any LED emission may be represented as multi- or hyperspectral data by acquiring the light anti-scatter properties of each pixel or equivalent of the scanned area.

The X-ray transmission comprises the permittivity of the objects to X-ray radiation and is measured by the X-ray camera arranged opposite to the X-ray emitter on the other side of the objects. The permittivity of the objects to X-ray radiation may indicate their atomic density and/or their thickness. The X-ray emitter may be considered as the radiation source or be provided separately. The X-ray camera may have a single, dual or multiple energy measurement range. The X-ray transmission may be represented as multi- or hyperspectral data by acquiring a separate spectrum of transmission for each pixel or equivalent of the scanned area.

X-ray fluorescence allows the detection of existing elements in particles. The material will be excited by low-energy X-ray radiation and element specific fluorescence will be released. With an energy dispersive X-ray sensor, this fluorescence may be measured and represented as multi- or hyperspectral data. The result of the fluorescence is information about presence of elements and their concentration.

Figure 6B:
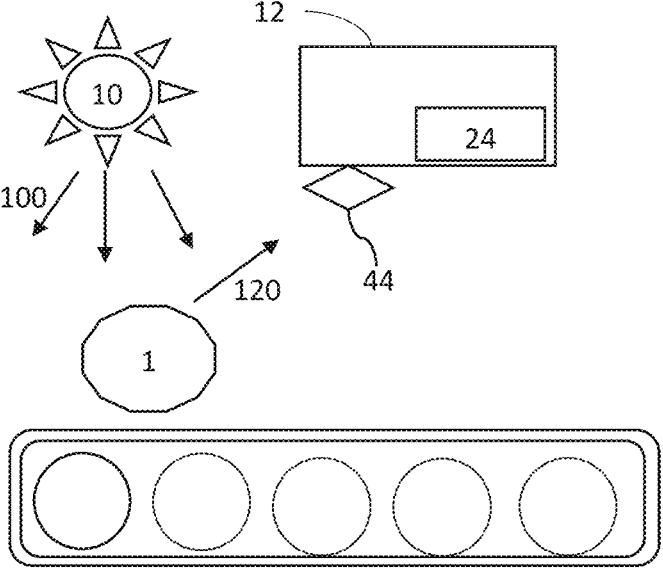
FIG. 6b shows a bulk sorting system comprising a hyperspectral camera according to an embodiment.

FIG. 6b shows a bulk sorting system comprising a hyperspectral camera 44 arranged to scan the objects, wherein the multi- or hyperspectral data comprises the scan data. The hyperspectral camera is beneficial in that it is an efficient way to gather a lot of data to be used by the CNN.

Figure 7:
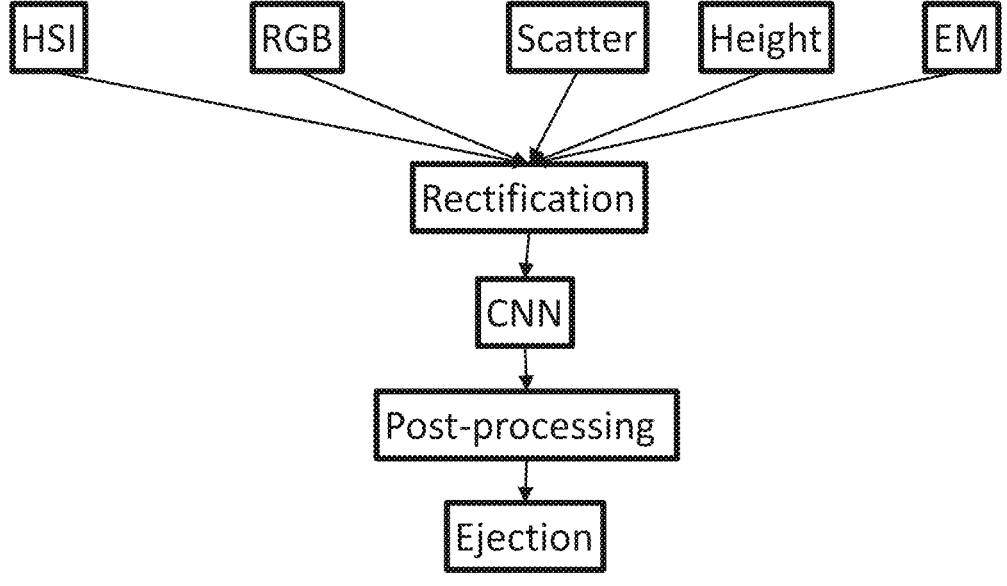
FIG. 7 shows a flowchart for operations of the processing circuit according to an embodiment.

FIG. 7 shows a flowchart for operations of the processing circuit according to one embodiment. Different data is collected from the different sensors (note that the sensors included in FIG. 7 are only by way of example) and rectified into multi- or hyperspectral data. This multi- or hyperspectral data is input into the CNN. The CNN outputs detected and classified and/or semantically segmented multi- or hyperspectral data to be post-processed.

The data collected in the example embodiment of FIG. 7 is HSI corresponding to a hyperspectral image captured by a a hyperspectral camera 44, RGB corresponding to a Red-Green-Blue image captured by an image sensor 32, Scatter corresponding to laser scatter and/or anti-scatter properties captured by a laser scanner 36, Height corresponding to 3D-data captured by a laser triangulator 34 and EM corresponding to electromagnetic properties captured by an electromagnetic detector 40.

The post-processing comprises converting the output into something the mechanical sorter may more easily interpret. This may comprise configuration instructions for the mechanical sorter to be created before sorting occurs of the objects corresponding to the measured data.

The post-processing may e.g. comprise interpreting the classification to find whether the detected objects are wanted or unwanted and creating instructions for the mechanical sorter regarding how to deal with these. These instructions may comprise a control schedule regarding which mechanical ejectors to activate when.

These post-processed instructions are then fed to the mechanical sorter that sorts the objects, which may comprise ejecting unwanted objects.

Figure 8:
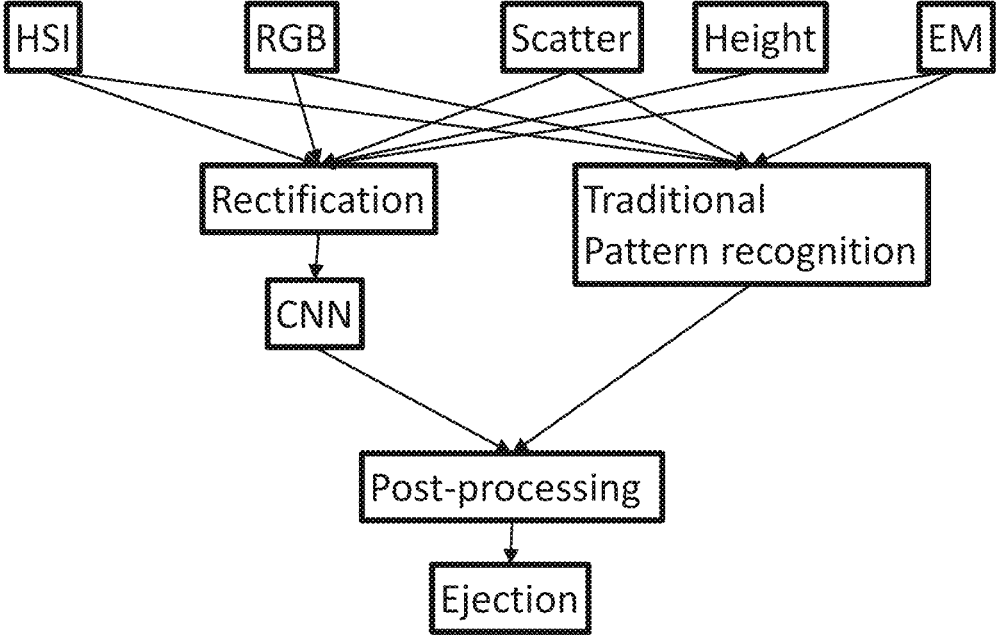
FIG. 8 shows a flowchart for hybrid operations of the processing circuit according to an embodiment.

FIG. 8 shows a flowchart for hybrid operations of the processing circuit comprising both a CNN and a traditional pattern recognition algorithm. In this embodiment, the processing circuit is configured to input at least a part of the multi- or hyperspectral data into a pattern recognition algorithm. The results of both the CNN and the pattern recognition algorithm are then used by the mechanical sorter to sort the objects, which may comprise post-processing the results before feeding them to the mechanical sorter or not.

The hybrid operations are beneficial in that different information may be obtained by the different analysis methods. While only two methods are disclosed in FIGS. 8-9, any type and number of optical and/or electromagnetic analyses are possible to combine in this manner.

In FIG. 8, a spectral scan, an RGB image, laser scatter and/or anti-scatter properties and electromagnetic properties are separately input to the traditional pattern recognition algorithm without collating the different data to a single multi- or hyperspectral data, however inputting multi- or hyperspectral data is also possible.

The data input into the different analysis methods may be the same or different. For example, in FIG. 8, 3D-data is input into the CNN and not into the traditional pattern recognition algorithm.

Figure 9:
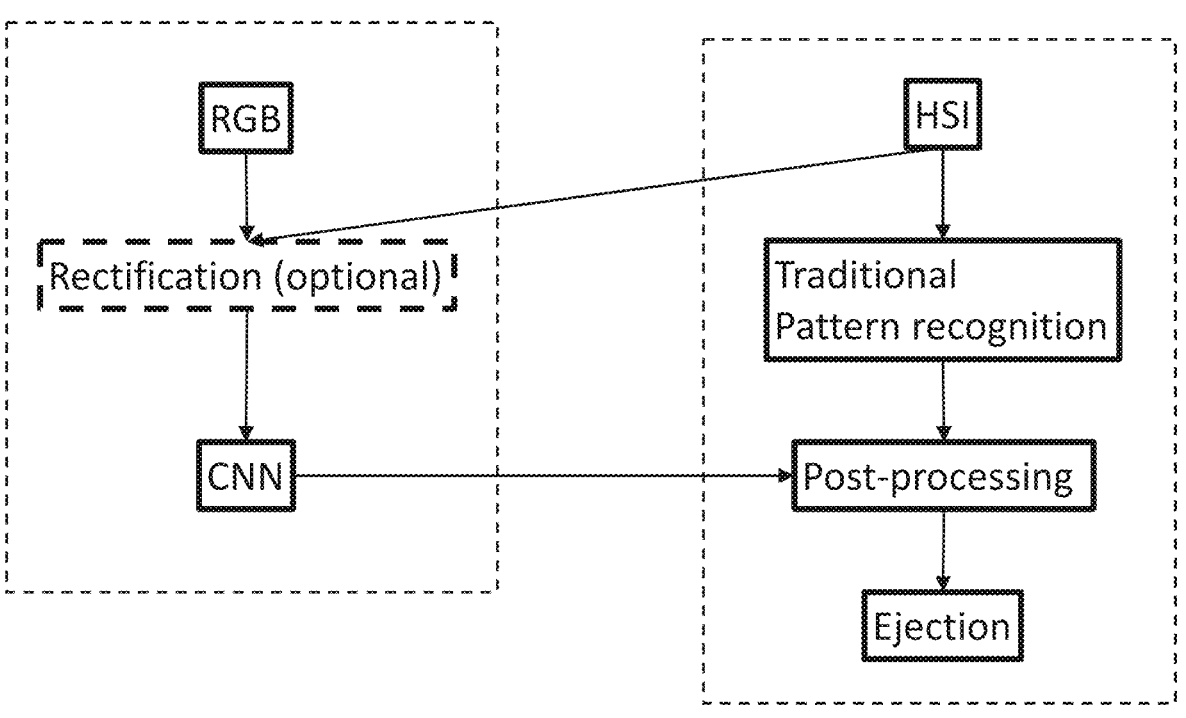
FIG. 9 shows a flowchart for hybrid operations of the processing circuit using two computing units according to an embodiment.

FIG. 9 shows a flowchart for hybrid operations of the processing circuit using two computing units, shown as dashed boxes. This embodiment uses different computing units for different types of data analysis, such that the computing unit to the left uses a CNN and the computing unit to the right uses traditional pattern recognition and post-processing.

This is beneficial in that each computing unit may be optimized for a specific type of analysis, thus increasing efficiency of the analysis step and reducing the total time for sorting.

This separation may be implemented in a number of ways, such as several computing units implementing the CNN analysis, or the post-processing being implemented in a separate computing unit. There is no limit to the amount of computing units that may cooperate for the operation of the processing circuit, and hybrid operations are possible but not required.

Figure 10:
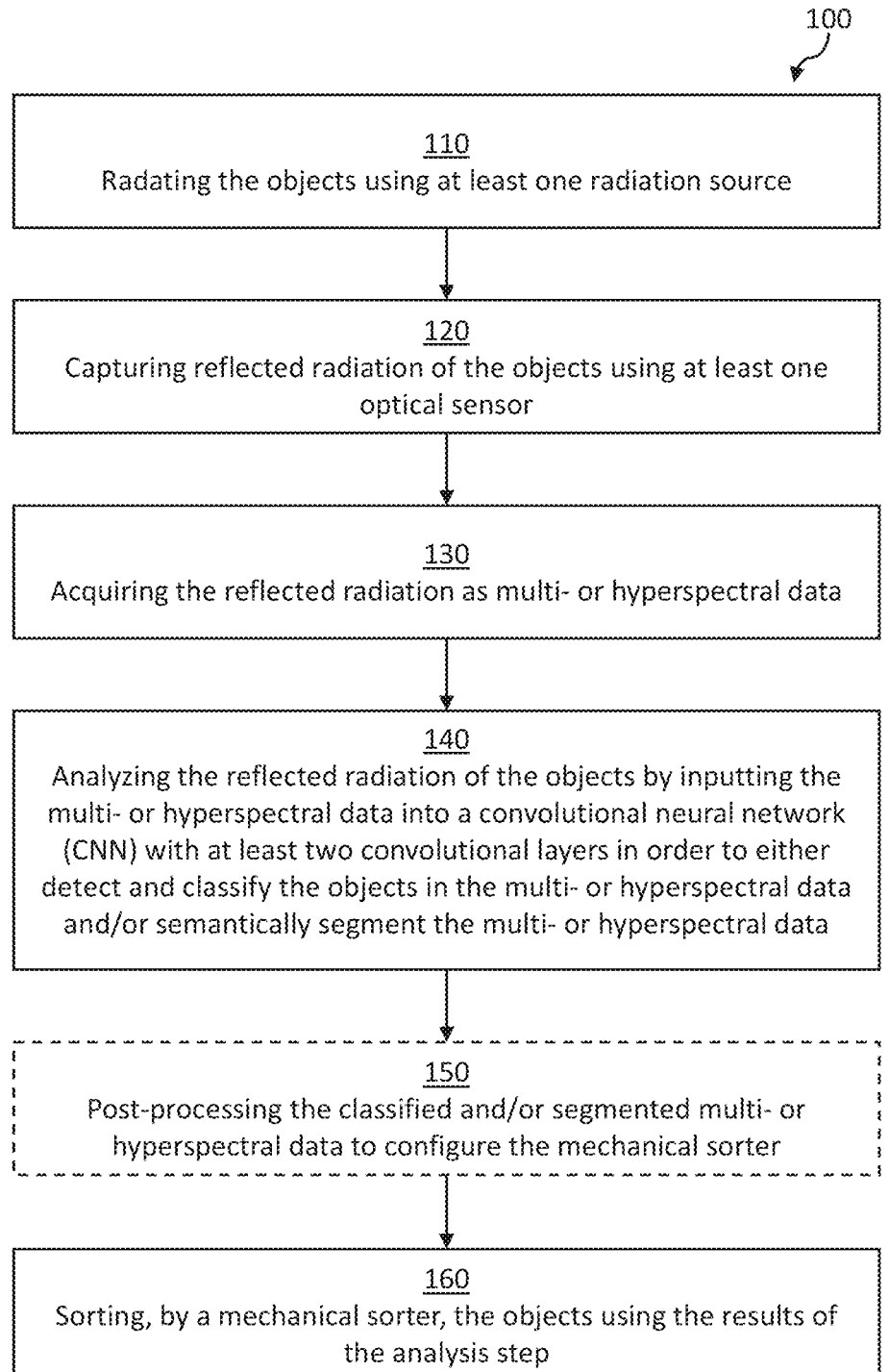
FIG. 10 shows a flowchart for a method for sorting objects in bulk according to an embodiment.

FIG. 10 shows a flowchart for a method for sorting objects in bulk. The method 100 comprises several steps that are performed in order.

The radiating step 110 comprises radiating the objects using at least one radiation source. The radiation source may be an LED, a light bulb, a laser, an X-ray emitter and/or any other suitable radiation source. The radiation source may be arranged as different units, as ambient illumination and/or to radiate in different directions.

The capturing step 120 comprises capturing reflected radiation of the objects using at least one optical sensor. The optical sensor may be a near-infrared (NIR) scanner, an image sensor, a laser triangulator, a laser scanner, a pulsed LED emitter and/or an X-ray camera.

The acquiring step 130 comprises acquiring the reflected radiation as multi- or hyperspectral data. This may comprise converting the captured radiation into multi- or hyperspectral data. This step 130 may be performed in conjunction of the capturing step 120 as the reflected radiation is captured.

The multispectral data may be a multi-dimensional image where each pixel or equivalent (such as super pixel or grouping of pixels) comprises a few bands (order of magnitude 1-10) with wide spectrums (order of magnitude 100-1000 nm). The hyperspectral data may be a multi-dimensional image where each pixel or equivalent (such as super pixel or grouping of pixels) comprises many bands (order of magnitude 4-10000) with narrow spectrums (order of magnitude 1-50 nm).

The analysis step 140 comprises analysing the reflected radiation of the objects by inputting the multi- or hyperspectral data into a convolutional neural network (CNN) with at least two convolutional layers in order to either detect and classify the objects in the multi- or hyperspectral data and/or semantically segment the multi- or hyperspectral data.

This step 140 is preferably performed by a processing circuit that may include a processor, such as a central processing unit (CPU), microcontroller, or microprocessor. The processor is configured to execute program code stored in a memory, in order to carry out at least one step of the method for sorting objects in bulk.

The sorting step 160 comprises sorting, by a mechanical sorter, the objects using the results of the analysis step 140. The mechanical sorter may be at least one valve, mechanical kicker, robot arm or any other suitable device capable of mechanically moving objects.

The method 100 may further comprise a post-processing step 150 that comprises post-processing the result of the analysis step 140 to convert the result into something more suitable for use in the sorting step.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

The invention claimed is:

1. A bulk sorting system for sorting objects in bulk comprising:
   at least one radiation source arranged to radiate the objects;
   at least one optical sensor arranged to capture reflected radiation of the objects and acquire the reflected radiation as multi- or hyperspectral data, comprising a near-infrared (NIR) scanner arranged to scan the objects, wherein the multi- or hyperspectral data comprises the scan data;
   a processing circuit configured to analyze the reflected radiation of the objects by inputting the multi- or hyperspectral data into a convolutional neural network (CNN) with at least two convolutional layers in order to detect and semantically segment the multi- or hyperspectral data, wherein the CNN is trained with sample images including images of overlapping objects with corresponding labels of the overlapping objects; and
   a mechanical sorter configured to sort the objects according to their classification using the analysis of the processing circuit such that different overlapping and/or stacked objects, as analyzed by the processing circuit, are treated as a single group of objects, and
   wherein for the group of objects comprises at least a first object type and a second object type, and the mechanical sorter is configured to sort the group of objects as either the first object type or the second object type based on a preference in the bulk sorting system.

2. The bulk sorting system according to claim 1, wherein the at least one optical sensor comprises an image sensor arranged to capture image data of the objects, wherein the multi- or hyperspectral data comprises the image data.

3. The bulk sorting system according to claim 1, wherein the at least one optical sensor comprises a multi- or hyperspectral camera arranged to scan the objects, wherein the multi- or hyperspectral data comprises the scan.

4. The bulk sorting system according to claim 1, wherein the at least one optical sensor comprises a laser triangulator arranged to measure 3D-data of the objects, wherein the multi- or hyperspectral data comprises the 3D-data, wherein the measurement of 3D-data may comprise laser height intensity scanning.

5. The bulk sorting system according to claim 1, further comprising an electromagnetic detector arranged to measure electromagnetic properties of the objects, wherein the processing circuit is further configured to analyze the electromagnetic properties by inputting the measured electromagnetic properties into the CNN in order to detect and semantically segment the multi- or hyperspectral data and optionally classify the objects in the multi- or hyperspectral data.

6. The bulk sorting system according to claim 1, wherein the at least one optical sensor comprises a laser scanner with a rotating polygon mirror arranged to measure laser scatter and/or anti-scatter properties of the objects, a pulsed LED emitter arranged to measure light anti-scatter properties of the objects and/or an X-ray camera arranged to measure X-ray transmission of the objects; wherein the multi- or hyperspectral data comprises the laser scatter and/or anti-scatter properties, the light anti-scatter properties and/or the X-ray transmission of the objects, respectively.

7. The bulk sorting system according to claim 1, further comprising conveying the objects along detection range(s) of the at least one optical sensor to the mechanical sorter using a conveyor belt.

8. The bulk sorting system according to claim 1, wherein the mechanical sorter is further configured to separate the objects into at least two streams and/or to eject unwanted objects from the bulk.

9. The bulk sorting system according to claim 1, wherein the mechanical sorter is arranged to target the center of gravity or boundaries of the objects, as analyzed by the processing circuit.

10. The bulk sorting system according to claim 1, further comprising post-processing the detected and classified multi- or hyperspectral data to configure the mechanical sorter before sorting occurs.

11. The bulk sorting system according to claim 1, wherein the processing circuit is further configured to input at least a part of the multi- or hyperspectral data into a pattern recognition algorithm; and
  wherein the results of both the CNN and the pattern recognition algorithm are used by the mechanical sorter to sort the objects according to their detection and classification verified by the pattern recognition algorithm.

12. A method for sorting objects in bulk comprising steps of:
  radiating the objects using at least one radiation source;

capturing reflected radiation of the objects using at least one optical sensor, comprising capturing a scan using a multi- or hyperspectral scanner;
  acquiring the reflected radiation, comprising the scan, as multi- or hyperspectral data;
analyzing the reflected radiation of the objects by inputting the multi- or hyperspectral data into a convolutional neural network (CNN) with at least two convolutional layers in order to detect and semantically segment the multi- or hyperspectral data and optionally classify the objects in the multi- or hyperspectral data, wherein the CNN is trained with sample images including images of overlapping objects with corresponding labels of the overlapping objects; and
  sorting, by a mechanical sorter, the objects according to their classification using the results of the analysis step such that different overlapping and/or stacked objects, as analyzed by the processing circuit, are treated as a single group of objects.

13. The method for sorting objects in bulk according to claim 12, wherein capturing reflected radiation of the objects using at least one optical sensor comprises capturing a scan using a NIR scanner.

14. The bulk sorting system according to claim 1, wherein the processing circuit is further configured to analyze the reflected radiation of the objects by inputting the multi- or hyperspectral data into the convolutional neural network (CNN) to classify the objects in the multi- or hyperspectral data.

15. The method for sorting objects in bulk according to claim 12, wherein for the group of objects comprises at least a first object type and a second object type, and the method further comprises:
  sorting by the mechanical sorter the group of objects as either the first object type or the second object type based on a preference in the bulk sorting system.

* * * * *